United States Patent
Jin et al.

(10) Patent No.: US 10,406,572 B2
(45) Date of Patent: *Sep. 10, 2019

(54) BIOELECTROCHEMICAL DEVICES FOR ENHANCED IN SITU BIOREMEDIATION

(71) Applicants: ADVANCED ENVIRONMENTAL TECHNOLOGIES, LLC, Fort Collins, CO (US); THE REGENTS OF THE UNIVERSITY OF COLORADO, Denver, CO (US)

(72) Inventors: Song Jin, Fort Collins, CO (US); Paul Harold Fallgreen, Fort Collins, CO (US); Zhiyong Ren, Highlands Ranch, CO (US)

(73) Assignees: Advanced Environmental Technologies, LLC, Fort Collins, CO (US); The Regents of the University of Colorado, Denver, CO (US)

( * ) Notice: Subject to any disclaimer, the term of this patent is extended or adjusted under 35 U.S.C. 154(b) by 693 days.

This patent is subject to a terminal disclaimer.

(21) Appl. No.: 14/735,712

(22) Filed: Jun. 10, 2015

(65) Prior Publication Data

US 2015/0353386 A1 Dec. 10, 2015

Related U.S. Application Data

(60) Provisional application No. 62/010,333, filed on Jun. 10, 2014.

(51) Int. Cl.
*B09C 1/00* (2006.01)
*B09C 1/08* (2006.01)
(Continued)

(52) U.S. Cl.
CPC .............. *B09C 1/085* (2013.01); *B09C 1/002* (2013.01); *B09C 1/10* (2013.01); *B09C 2101/00* (2013.01); *C02F 2103/06* (2013.01)

(58) Field of Classification Search
CPC ..... B09C 1/002; B09C 1/085; B09C 2101/00; C02F 2103/06
See application file for complete search history.

(56) References Cited

U.S. PATENT DOCUMENTS

| 6,709,567 B1 * | 3/2004 | Sale ........................ B09C 1/002 204/275.1 |
| 9,545,652 B2 * | 1/2017 | Zuo ......................... B09C 1/085 |

(Continued)

OTHER PUBLICATIONS

L. Huang, S. Cheng, G. Chen. "Bioelectrochemical systems for efficient recalcitrant wastes treatment." Dec. 23, 2010. vol. 86, Issue 4. pp. 481-491 (Year: 2010).*

(Continued)

*Primary Examiner* — Steven A. Friday
(74) *Attorney, Agent, or Firm* — Santiago Law Offices, P.C.

(57) ABSTRACT

A bioelectrochemical system device may be used to enhance groundwater pollutant chemical removal or degradation. Such a bioelectrochemical system may be inserted into the environment to be remediated through a variety of techniques, such as through insertion into wells or other access points, trench insertion, direct insertion, borehole insertion, or combinations thereof. In some aspects, the bioelectrochemical system device may have a hollow-tube configuration with an outer ring anode and inner ring cathode. In further aspects, the bioelectrochemical system device may have a modular form that can be combined with multiple other modules such one or more bioelectrochemical system devices.

10 Claims, 5 Drawing Sheets

(51) Int. Cl.
    *C02F 1/46*         (2006.01)
    *B09C 1/10*         (2006.01)
    *C02F 103/06*     (2006.01)

(56) References Cited

U.S. PATENT DOCUMENTS

| | | | | |
|---|---|---|---|---|
| 2003/0075435 | A1* | 4/2003 | Kemner | B09C 1/002 204/252 |
| 2007/0142693 | A1* | 6/2007 | Adachi | B09C 1/085 588/318 |
| 2007/0243022 | A1* | 10/2007 | Pool | B09C 1/002 405/128.1 |
| 2012/0070696 | A1* | 3/2012 | Jin | C02F 3/005 429/2 |
| 2015/0314344 | A1* | 11/2015 | Perpezat | E02D 5/46 405/128.5 |

OTHER PUBLICATIONS

X. Wang, Z. Cai, Q. Zhou, Z. Zhang, C. Chen. "Bioelectrochemical Stimulation of Petroleum Hydrocarbon Degradation in Saline Soil Using U-Tube Microbial Fuel Cells." Oct. 17, 2011. vol. 109, Issue 2. (Year: 2011).*

Y. Yuan, S. Zhou, L. Zhuang. "A new approach to in situ sediment remediation based on air-cathode microbial fuel cells" Journal of Soils and Sediments. Aug. 5, 2010. vol. 10, Iss. 7. pp. 1427-1433 (Year: 2010).*

* cited by examiner

BIOELECTROCHEMICAL DEVICES FOR ENHANCED IN SITU BIOREMEDIATION

CROSS REFERENCE TO RELATED APPLICATIONS

This application claims priority to U.S. provisional patent application Ser. No. 62/010,333, filed on Jun. 10, 2014 and entitled "BIOELECTROCHEMICAL DEVICES FOR ENHANCED IN SITU BIOREMEDIATION," which is incorporated herein by reference in its entirety.

JOINT RESEARCH AGREEMENT

The claimed invention was made by, on behalf of, and/or in connection with the following parties to a joint research agreement: (1) CHEVRON USA INC., ACTING THROUGH ITS CHEVRON ENERGY TECHNOLOGY COMPANY DIVISION (2) REGENTS OF THE UNIVERSITY OF COLORADO, A BODY CORPORATE, FOR AND ON BEHALF OF THE UNIVERSITY OF COLORADO DENVER and (3) ADVANCED ENVIRONMENTAL TECHNOLOGIES, LLC. The agreement was in effect on and before the date the claimed invention was made, and the claimed invention was made as a result of activities undertaken within the scope of the agreement.

FIELD

Various aspects of the disclosure relate to environmental remediation. More specifically, aspects relate to the utilization of a bioelectrochemical system to enhance microbial oxidation of chemicals in the environment that are considered pollutants.

BACKGROUND

Removal and degradation of chemical pollutants in groundwater systems often involve in situ methods and technologies. Biological methods, such as monitored natural attenuation (MNA) and bioremediation, utilize microorganisms naturally existing in the groundwater sediments to degrade or transform chemical pollutants into non-toxic forms. Bioremediation and MNA are considered more cost-effective remedies for lower contaminant levels than other remediation methods, and are often integrated with other remediation technologies or remediation strategic plans.

Furthermore, in situ methods of remediation may be desirable due to reduced cost and reduced disruption to the environment being remediated. Additionally, such techniques may be employed in some environments where other types of remediation (e.g., excavation) may not be feasible. Accordingly, enhanced techniques for in situ remediation of contaminants may be desirable.

SUMMARY

Various aspects of the disclosure provide apparatuses and techniques for enhanced in situ remediation of contaminants in an environment. In some aspects, a bioelectrochemical system device may be used to enhance groundwater pollutant chemical removal or degradation. Such a bioelectrochemical system may be inserted into the environment to be remediated through a variety of techniques, such as through insertion into wells or other access points, trench insertion, direct insertion, borehole insertion, or combinations thereof. In some aspects, the bioelectrochemical system device may have a hollow-tube configuration with an outer ring anode and inner ring cathode. In further aspects, the bioelectrochemical system device may have a modular form that can be combined with multiple other modules such one or more bioelectrochemical system devices.

In some examples, a bioelectrochemical apparatus for enhancing remediation of contaminated matrices is provided. The apparatus may include at least one cathode that at least partially encloses an air-permeable hollow tube; at least one non-conductive permeable separator that at least partially encloses the at least one cathode; at least one anode that at least partially encloses the at least one non-conductive permeable separator; and at least one transmission line connecting a load to the at least one anode and the at least one cathode. Such a bioelectrochemical apparatus may be inserted in an environment having at least one contaminant and at least one microbial population. The apparatus may include, in some examples, an installation section coupled with the at least one anode, which may include a pipe extension coupled with the air-permeable hollow tube, a connection member, and a weight. The air-permeable hollow tube, cathode, separator, and anode may be configured, in some examples, to be submerged in groundwater with the pipe extension extending above the groundwater.

In some examples, a method of utilizing said bioelectrochemical system for remediation of contaminated matrices may include providing a bioelectrochemical apparatus comprising a cathode that at least partially encloses an air-permeable hollow tube, a non-conductive permeable separator that at least partially encloses the cathode, an anode that at least partially encloses the non-conductive permeable separator, and a transmission line connecting a load to the anode and the cathode; inserting the bioelectrochemical apparatus into an environment having at least one contaminant and at least one microbial population; and applying a potential to the transmission line. In some examples, the environment is selected from a group consisting of groundwater, sediments, unsaturated zone, vadose zone, saturated zone, saturated soil, unsaturated soil, capillary fringe, fractured rock, surface water, and any combination thereof. In some examples, the at least one contaminant is selected from a group consisting of organic contaminants, hydrocarbons, phenols, petroleum related compounds, petroleum hydrocarbons, gasoline range organics, diesel range organics, volatile organic compounds, semi-volatile organic compounds, halogenated compounds, endocrine disrupting compounds, arsenic, selenium, and any combination thereof. In some other examples, the at least on microbial population is selected from a group consisting of indigenous microbial population, aerobic microorganisms, facultative microorganisms, obligate anaerobic microorganisms, and any combination thereof. In certain examples, the inserting may include well insertion, direct insertion, borehole insertion, trench insertion, or any combination thereof.

The foregoing has outlined rather broadly the features and technical advantages of examples according to the disclosure in order that the detailed description that follows may be better understood. Additional features and advantages will be described hereinafter. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF DRAWINGS

Aspects of the disclosure are described in reference to the following figures.

DETAILED DESCRIPTION

Bioelectrochemical (BEC) systems are technologies that have been studied and applied for environmental remediation. A BEC system is typically composed of at least one anode and one cathode that are connected through a load of some set resistance. BEC system process mechanisms typically involve oxidation of an organic or inorganic compound by bacteria where electrons are transferred to the BEC system anode. The electrons transfer to the cathode, which reduces oxygen or other electron-accepting chemicals. For environmental remediation, BEC systems can enhance microbial oxidation of pollutant compounds; however, for in situ remediation, BEC systems are limited by practical configurations and the difficulty of implementation.

In situ groundwater bioremediation and MNA involve wells for implementing treatments/technologies and/or monitoring. Such wells can be used for passive treatment processes, such as BEC systems, that can complement existing remediation strategies. In order to enhance efficiencies in BEC systems via wells, configurations are provided according to various aspects of the disclosure which provide increased contact of cathode with the atmosphere while facilitating proton ($H^+$) transfer. In some aspects of the disclosure, ease of implementation is enhanced for BEC for in situ soil and/or groundwater bioremediation, which enhances the practicality of a BEC system configuration.

The following descriptions are provided to illustrate elements and describe some of the aspects of the present disclosure. These elements are listed with initial examples, however it should be understood that they may be combined in any manner and in any number to create additional examples. The variously described examples should not be construed to limit the present invention to only the explicitly described systems, techniques, and applications.

Various aspects of the present disclosure include a device comprising at least one bioelectrochemical system module, which can be inserted into an environmental matrix to enhance removal or degradation of pollutant chemicals. Environmental matrices containing the organic contaminants may include, but are not limited to, soil, sediments, groundwater, fractured rock, and surface water. Pollutant chemicals may include, but are not limited to, petroleum hydrocarbons, volatile organic compounds, semi-volatile organic compounds, ethers, fuel oxygenates, ketones, alcohols, amines, amides, monoaromatic compounds, chlorinated solvents, halogenated hydrocarbons, endocrine disrupting compounds, dioxanes, dioxins, polycyclic aromatic hydrocarbons, polychlorinated biphenyls, chlorobenzenes, phenols, chemical oxygen demand, arsenic, and selenium.

Figure 1:
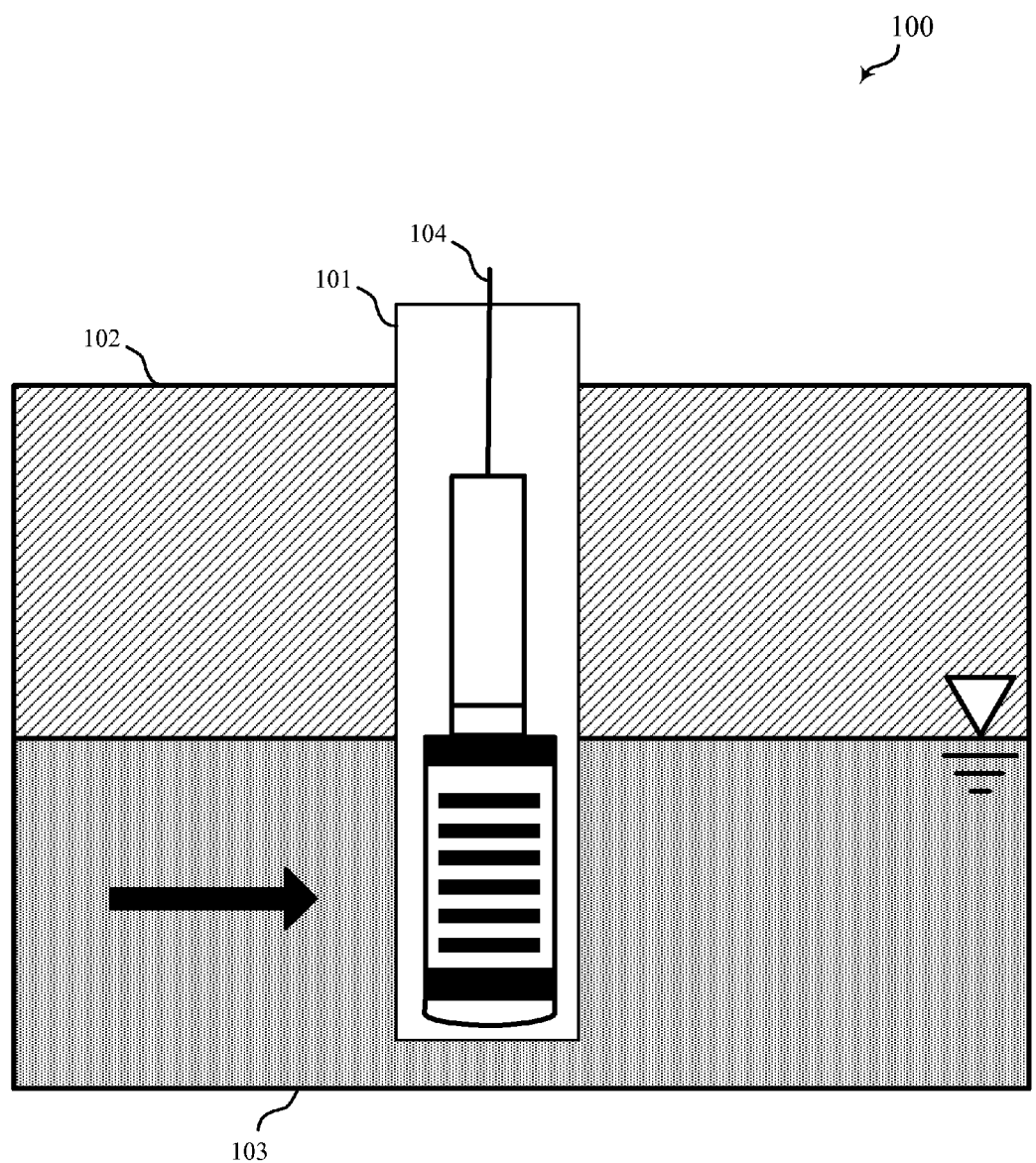
FIG. 1 illustrates a bioelectrochemical system according to various aspects of the present disclosure.

FIG. 1 illustrates an example 100 of a bioelectrochemical (BEC) system module 101 inserted into the groundwater zone 103, such as through a well or other insertion technique that penetrates a first zone 102 above the groundwater zone 103. The points of insertion may include, but are not limited to, established monitoring and treatment wells with screens, bore holes, trenches, and direct insertion into the environmental matrix. The BEC system module 101, as will be discussed in more detail below, may be a hollow-tube BEC system module inserted into a well within the groundwater zone 103. A perforated casing of the BEC system module of this example may expose an anode material to polluted groundwater, which may pass through, for example, a well screen. The BEC system module 101 may be inserted into a well by using a line 104 (rope or other material) to lower the BEC system module 101, and that may be tied at the surface to fix the device in place.

Figure 2:
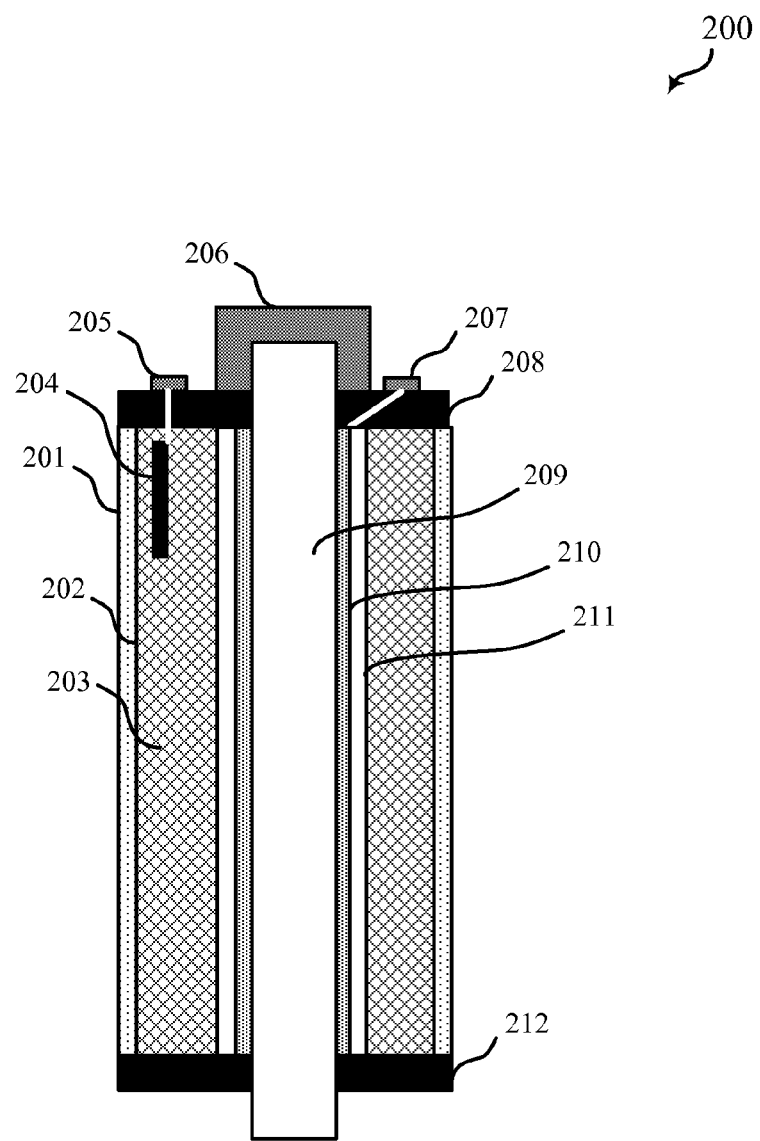
FIG. 2 illustrates a side cross section view of a bioelectrochemical system according to various aspects of the present disclosure.

FIG. 2 is an example of a BEC system module 200, showing a side cross section view thereof. The BEC system module 200 of this example is a single hollow tube bioelectrochemical system module. The system may include a perforated non-conductive tubular casing 201, a course granular anode material 202, a fine granular anode material 203, a conductive connecter to the granular anode material 204, a lead or connecting receptacle for connecting a load to the anode 205, a connecter fitting 206 to connect add-ons (e.g., second module), a lead or connecting receptacle 207 for connecting a load to the cathode, a support and seal 208 for encasing electrodes, central hollow perforated tube 209, a cathode material 210 with or without catalyst and with waterproof coating, an electrode separator 211, and a support and seal 212 for encasing electrodes.

Figure 3:
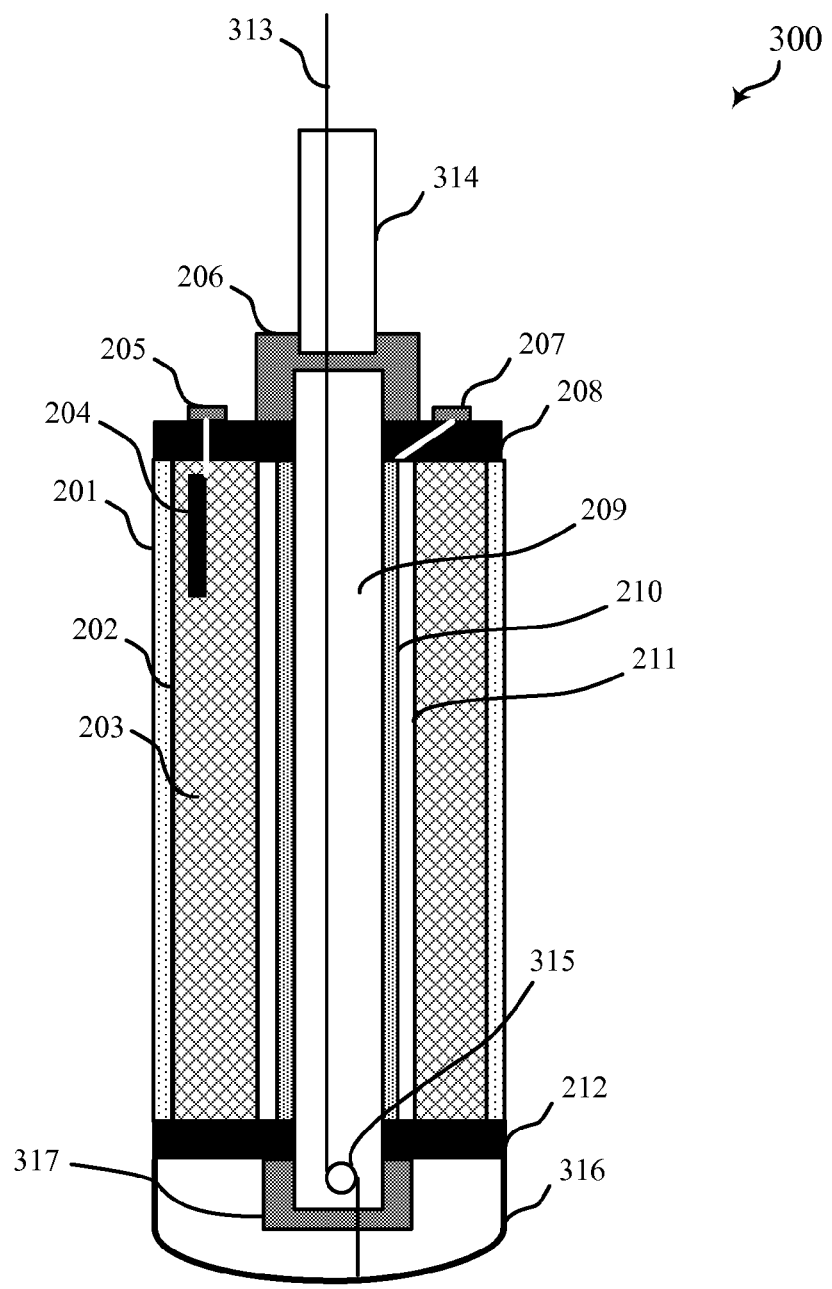
FIG. 3 illustrates a side cross section view of another bioelectrochemical system according to various aspects of the present disclosure.

FIG. 3 is an example of a side cross section view of a single hollow tube bioelectrochemical system module 300 with additional parts for full installation. The additional parts of the module in this example include a line or rope 313 to surface for lowering the module 300 and fixing module 200 in place, a pipe extension 314 above groundwater table for air capture, a connection member 315, such as a hook, ring, or clamp, embedded in weight material and attached to the line or rope 313, a cap 316 filled with dense material for weight to keep module 300 vertical in water, and a connector 317 fitting embedded in weight material to connect to the bottom of module 300.

Figure 4:
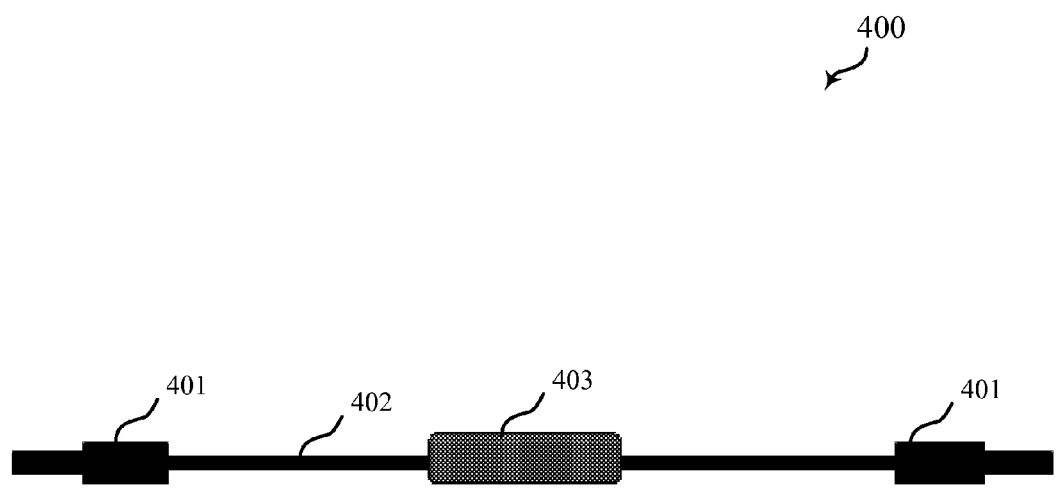
FIG. 4 illustrates a load and wire with conductive waterproof connectors at each end of a bioelectrochemical system according to various aspects of the present disclosure.

FIG. 4 is an example 400 of a load 403 (e.g., resistor) and wire 402 with conductive waterproof connectors 401 at each end. The load 403 and wire 402 connect the anode to the cathode.

Figure 5:
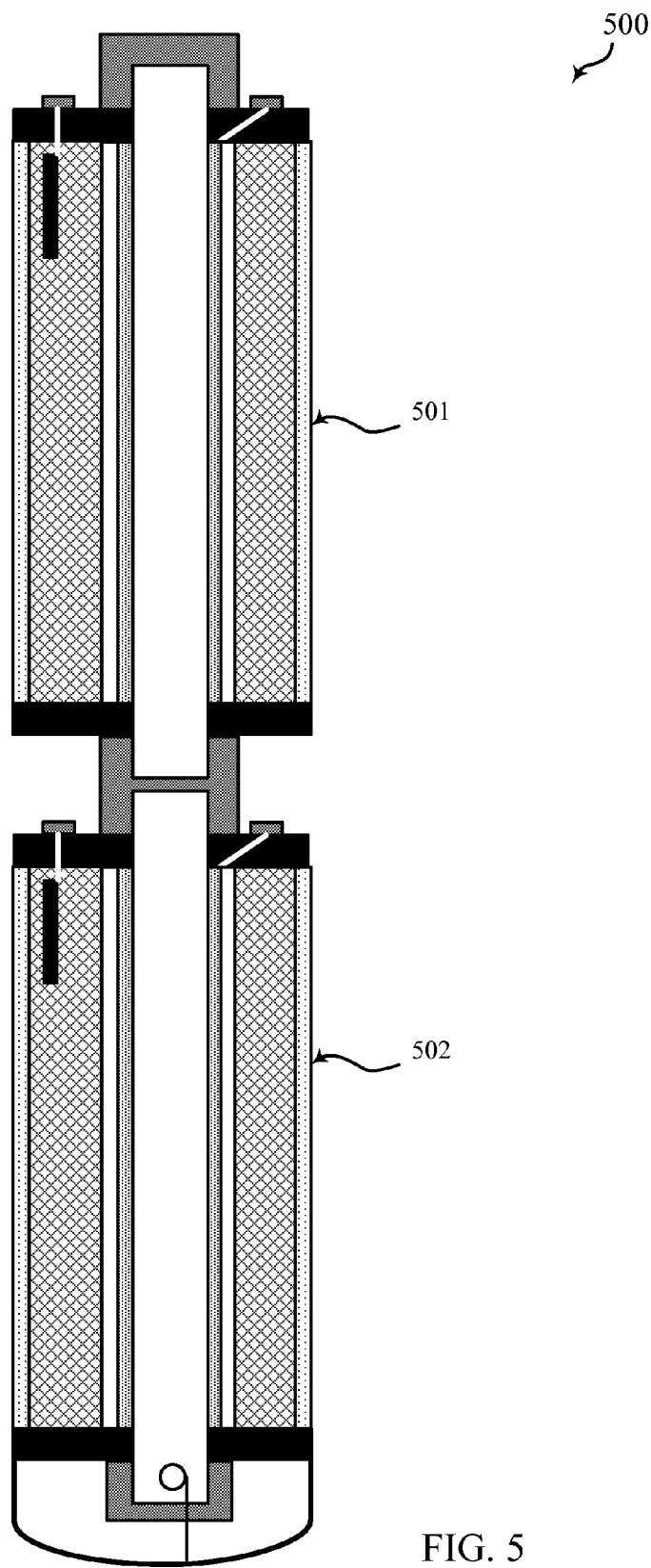
FIG. 5 illustrates two coupled bioelectrochemical system modules according to various aspects of the present disclosure.

FIG. 5 illustrates a side cross section view 500 of a first hollow tube bioelectrochemical systems module 501 connected to a second hollow tube bioelectrochemical systems module 502.

According to some examples, a single bioelectrochemical system module, such as illustrated in FIGS. 1-5, may be inserted into a polluted subsurface zone, such as illustrated in FIG. 1. Each bioelectrochemical system module includes at least one anode, at least one separator, and at least one cathode, all surrounding a hollow tube or pipe. The anode may be fixed as the outermost layer surrounding the hollow tube or pipe. The cathode may be fixed as the innermost layer surrounding and directly in contact with the hollow tube or pipe. The separator may be fixed in between the anode and cathode layers surrounding the hollow tube or pipe. The hollow tube or pipe, in examples, is perforated to allow contact with air or oxygen. Possible hollow tube or pipe materials include, but are not limited to, polyvinyl chloride, polymethyl methacrylate, fiberglass, high-density polytetrafluoroethylene, and other plastics. Possible anode materials may include, but are not limited to, granulated activated carbon, biochar, graphite, petroleum coke, anthracite, carbon clothe, carbon fiber, carbon fiber brush, iron filings, stainless steel, stainless steel mesh, stainless steel wool, stainless steel foam, and stainless steel brush. Possible separator materials may include, but are not limited to, glass fiber, polyester mesh or cloth, and polypropylene fiber cloth. Possible cathode materials may include, but are not limited to, fine stainless steel mesh, stainless steel foam, carbon cloth, activated carbon, and carbon paper. The cathode may not or may be coated with a catalyst, which may include but not limited to, platinum/carbon (Pt/C) catalyst, iridium catalyst, zinc oxide, lead oxides, and titanium oxides (rutile). On one side, the cathode is coated with a waterproof but air permeable material, which may include, but not limited to, polytetrafluoroethylene or poly(dimethylsiloxane).

The anode and cathode are connected to respective leads or receptacles, where wire connectors connect a load or simple resistor to the anode and cathodes. FIG. 4 is an example of a load and wire that is constructed for quick plug-in to the anode and cathode receptacles. The resistance of the load or resistor may range, for example, from 0 to 10,000 ohm.

Additional hollow tubes may be connected to the top of the module, where the connections may include, but are not limited to, male-female threading and fittings, o-ring and clamps, or slide fittings with glue. The additional hollow tubes or pipes may enhance air capture or flow from the ground surface to the cathode. A weighted cap may be connected to the bottom of the bioelectrochemical system module, where connections are similar to the top of the module. The weight material in the cap may include, but is not limited to, concrete, packed sand, gravel, steel ball bearings, or metal plating. A hook, ring, or clamp embedded in the cap or weight material connects to rope, or line constructed from other material, which is used to lower the bioelectrochemical system down a well or bore hole.

FIG. 5, as mentioned above, is an example of two modules 501 and 502 connected together. Multiple modules may be connected (e.g., stacked) together as needed depending on the contaminated zone height. The connections are made similarly as with the additional hollow tubes and weighted cap.

In some examples, a method of utilizing said bioelectrochemical system for remediation of contaminated matrices may include providing a bioelectrochemical apparatus comprising a cathode that at least partially encloses an air-permeable hollow tube, a non-conductive permeable separator that at least partially encloses the cathode, an anode that at least partially encloses the non-conductive permeable separator, and a transmission line connecting a load to the anode and the cathode; inserting the bioelectrochemical apparatus into an environment having at least one contaminant and at least one microbial population; and applying a potential to the transmission line. In some examples, the environment is selected from a group consisting of groundwater, sediments, unsaturated zone, vadose zone, saturated zone, saturated soil, unsaturated soil, capillary fringe, fractured rock, surface water, and any combination thereof. In some examples, the at least one contaminant is selected from a group consisting of organic contaminants, hydrocarbons, phenols, petroleum related compounds, petroleum hydrocarbons, gasoline range organics, diesel range organics, volatile organic compounds, semi-volatile organic compounds, halogenated compounds, endocrine disrupting compounds, arsenic, selenium, and any combination thereof. In some other examples, the at least on microbial population is selected from a group consisting of indigenous microbial population, aerobic microorganisms, facultative microorganisms, obligate anaerobic microorganisms, and any combination thereof. In certain examples, the inserting may include well insertion, direct insertion, borehole insertion, trench insertion, or any combination thereof.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the disclosure and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any method or process embodiment, or even merely a variation of any element of these. Particularly, it should be understood that as the disclosure relates to elements of the invention, the words for each element may be expressed by equivalent method terms—even if only the function or result is the same. Such equivalent, broader, or even more generic terms should be considered to be encompassed in the description of each element or action. Such terms can be substituted where desired to make explicit the implicitly broad coverage to which this invention is entitled.

What is claimed is:

1. A bioelectrochemical apparatus for enhancing remediation of contaminated matrices, comprising:
   at least one cathode that at least partially encloses a linear air-permeable hollow tube;
   at least one non-conductive permeable separator that at least partially encloses the at least one cathode;
   at least one anode that at least partially encloses the at least one non-conductive permeable separator; and
   at least one transmission line connecting a load to the at least one anode and the at least one cathode;

wherein said at least one cathode does not have a catalyst coating.

2. The apparatus of claim 1, wherein the bioelectrochemical apparatus is located in an environment having at least one contaminant and at least one microbial population.

3. The apparatus of claim 1, further comprising installation parts coupled with the at least one anode.

4. The apparatus of claim 1 and further comprising a pipe extension coupled with the linear air-permeable hollow tube, a weight, a line, and a connector between the weight and the line.

5. The apparatus of claim 4, wherein the air-permeable hollow tube, cathode, separator, and anode are configured to be submerged in groundwater and the pipe extension is configured to extend above the groundwater.

6. A method of utilizing a bioelectrochemical system for remediation of contaminated matrices, comprising:
providing a bioelectrochemical apparatus comprising a cathode that at least partially encloses a linear air-permeable hollow tube, wherein said cathode does not have a catalyst coating, a non-conductive permeable separator that at least partially encloses the cathode,
an anode that at least partially encloses the non-conductive permeable separator, and a transmission line connecting a load to the anode and the cathode;
inserting the bioelectrochemical apparatus into an environment having at least one contaminant and at least one microbial population; and
applying a potential to the transmission line.

7. The method of claim 6, wherein the environment is selected from a group consisting of groundwater, sediments, unsaturated zone, vadose zone, saturated zone, saturated soil, unsaturated soil, capillary fringe, fractured rock, surface water, and any combination thereof.

8. The method of claim 6, wherein the at least one contaminant is selected from a group consisting of organic contaminants, hydrocarbons, phenols, petroleum hydrocarbons, gasoline range organics, diesel range organics, volatile organic compounds, semi-volatile organic compounds, halogenated compounds, endocrine disrupting compounds, arsenic, selenium, and any combination thereof.

9. The method of claim 6, wherein the at least one microbial population is selected from a group consisting of aerobic microorganisms, facultative microorganisms, obligate anaerobic microorganisms, and any combination thereof.

10. The method of claim 6, wherein the inserting comprises well insertion, direct insertion, borehole insertion, trench insertion, or any combination thereof.

* * * * *